United States Patent
Jäger et al.

(10) Patent No.: US 6,875,153 B2
(45) Date of Patent: Apr. 5, 2005

(54) METHOD AND APPARATUS FOR AUTOMATIC ACTUATION OF A VEHICLE COMPONENT

(75) Inventors: Thomas Jäger, Meckenbeuren (DE); Hubert Friedmann, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/298,140

(22) Filed: Nov. 16, 2002

(65) Prior Publication Data

US 2003/0119628 A1 Jun. 26, 2003

Related U.S. Application Data

(63) Continuation-in-part of application No. PCT/DE01/01667, filed on Apr. 30, 2001.

(30) Foreign Application Priority Data

May 17, 2000 (DE) .......................................... 100 24 189

(51) Int. Cl.$^7$ ............................................... B60K 41/28
(52) U.S. Cl. ............................. 477/71; 477/93; 477/170
(58) Field of Search ............................... 477/71, 73–75, 477/92–95, 114, 170, 171; 192/219.1, 220.2, 13 R

(56) References Cited

U.S. PATENT DOCUMENTS

| | | | | |
|---|---|---|---|---|
| 4,618,040 A | * | 10/1986 | Honma et al. ................. | 477/71 |
| 4,660,691 A | * | 4/1987 | Messersmith et al. ........ | 477/71 |
| 4,871,215 A | * | 10/1989 | Takayama .................... | 303/191 |
| 5,020,645 A | * | 6/1991 | Sasa ............................. | 477/34 |
| 5,460,580 A | * | 10/1995 | Streib .......................... | 477/110 |
| 6,039,673 A | | 3/2000 | Mikami et al. ............... | 477/93 |

FOREIGN PATENT DOCUMENTS

| | | |
|---|---|---|
| DE | 44 32 456 A1 | 3/1996 |
| DE | 197 42 815 A1 | 4/1998 |
| DE | 198 56 137 A1 | 6/1999 |
| EP | 0 839 684 A1 | 5/1998 |

* cited by examiner

Primary Examiner—Sherry Estremsky
(74) Attorney, Agent, or Firm—Alfred J. Mangels

(57) ABSTRACT

A method and an actuating arrangement for automatically actuating a component of a motor vehicle brake is actuated by an externally applied force and independently of an actuation of a brake pedal by the driver of the vehicle clutch actuation occurs at times when the speed of the vehicle is substantially zero, or when the vehicle rolls backward with the gearbox engaged in a forward gear, or when the vehicle rolls forward with the gearbox engaged in a reverse gear. Clutch wear and tear is thereby reduced. Additionally, the vehicle clutch can also be automatically actuated by an externally applied force, to engage or to disengage the clutch based upon predetermined operating parameters of components of the vehicle.

18 Claims, 2 Drawing Sheets

METHOD AND APPARATUS FOR AUTOMATIC ACTUATION OF A VEHICLE COMPONENT

CROSS-REFERENCE TO RELATED APPLICATION

This application is a continuation-in-part of International Application Serial No. PCT/DE01/01667, filed Apr. 30, 2001, and published in the German language on Nov. 22, 2001, as International Publication No. WO 01/87680 A1, the disclosure of which is hereby incorporated by reference.

BACKGROUND OF THE INVENTION

1. Field of the Invention

The present application relates to the control of motor vehicles. More particularly, the present invention relates to the automatic control of a vehicle brake and of other vehicle components as a function of vehicle operating parameters.

2. Description of the Related Art

In order to keep a motor vehicle stationary on a slope or incline, in particular if the motor vehicle is caught up in a traffic jam, it is common to keep the vehicle at a standstill by a corresponding actuation of the clutch and the accelerator. Due to such a concerted actuation of the accelerator and the clutch, a drive torque is transmitted from the engine to the wheels of the motor vehicle that is just enough that the vehicle remains at a standstill on the incline. In cars with an automated clutch or an automatic transmission, the manual actuation of the clutch pedal is not applicable, and the car is kept at a standstill on the incline by simply actuating the accelerator pedal or the throttle control pedal. When a torque converter clutch is provided in the motor vehicle, a creeping function of the torque converter clutch can be used.

It has been found that the above-described operation to keep the motor vehicle at a standstill on a slope by a coordinated actuation of the brake pedal and the accelerator requires increased attention from the driver. Furthermore, the coordinated activation of the clutch and the engine results in increased wear and tear of the clutch. In addition, the actuation of the accelerator pedal and the operation of the engine above idle speed, in order to keep the motor vehicle at a standstill on an incline, consumes more fuel, resulting in increased fuel consumption during standstill.

SUMMARY OF THE INVENTION

In accordance with an exemplary embodiment of the present invention, a method is provided for automatic actuation of a brake of a vehicle. The brake acts on at least one first wheel of the vehicle, wherein the vehicle has an engine which is connected to at least one second wheel via a drive train with a clutch and a gearbox such that a drive torque can be transmitted from the engine to the at least one second wheel. The gearbox has a forward gear and a reverse gear. The method involves automatically actuating the brake of the vehicle by means of an external force when the engine is operating and when at least one condition selected from the group consisting of a first condition, a second condition, a third condition, and a fourth condition is fulfilled. The first condition is fulfilled when the clutch is actuated such that the transmission of the drive torque from the engine to the at least one wheel is not completely interrupted, the forward gear is engaged in the gearbox and the speed of the vehicle is substantially zero. The second condition is fulfilled when the clutch is actuated such that the transmission of the drive torque from the engine to the at least one wheel is not completely interrupted, the forward gear is engaged in the gearbox, and the vehicle is moving backward. The third condition is fulfilled when the clutch is actuated such that the transmission of the drive torque from the engine to the at least one wheel is not completely interrupted, the reverse gear is engaged in the gearbox, and the speed of the vehicle is substantially zero. And the fourth condition is fulfilled when the clutch is actuated such that the transmission of the drive torque from the engine to the at least one wheel is not completely interrupted, the reverse gear is engaged in the gearbox, and the vehicle is moving forward.

This exemplary embodiment of the present invention can be employed in a motor vehicle with a manually actuated clutch or an automated clutch.

In accordance with the above exemplary embodiment of the present invention, a vehicle brake is provided that can be actuated by means of an external force, independently of a manual actuation of the brake pedal. In accordance with exemplary embodiments of the present invention, the external force can be generated by means of an actuator, which can be an electric motor, or a hydraulic or a pneumatic actuator arrangement. Accordingly, a clutch in the drive train of the vehicle can be actuated in accordance with an exemplary embodiment of the present invention such that a transmission of a drive torque between the engine of the motor vehicle and at least one wheel of the motor vehicle is not completely interrupted. Accordingly, depending on the drive torque generated by the engine and transmitted to the at least one wheel via the clutch, the motor vehicle can be kept at a standstill on a slope. When it is detected that the transmission of torque between the engine and the at least one wheel is not completely interrupted and the speed of the vehicle is substantially zero while the forward gear is engaged in the gearbox, or that the vehicle is rolling backward, and/or while the reverse gear is engaged in the gearbox and the speed of the vehicle is zero, or the vehicle is rolling forward, it is believed that it can be assumed with high certainty that the vehicle is at an ascending or descending slope, and the driver of the motor vehicle wishes to stop the vehicle and to keep the vehicle at a standstill. When at least one of these conditions is fulfilled, the brake of the vehicle is actuated by means of the external force such that the vehicle is automatically kept at a standstill by means of the vehicle brake.

In accordance with another exemplary embodiment of the present invention, the external force is generated by means of an actuator independently of an actuation of a brake pedal of the vehicle.

In accordance with yet another exemplary embodiment of the present invention, the clutch is actuated by means of the external force, depending on operating parameters of the drive train. The operating parameters of the drive train can include, but are not limited to, the engine speed, the temperature of the clutch, vibrations in the drive train, or a gear ratio of the gear engaged in the gearbox. This exemplary embodiment of the present, invention can be used with motor vehicles having an automated clutch.

In accordance with yet another exemplary embodiment of the present invention, the clutch is completely disengaged when the brake of the vehicle is actuated by means of the external force. It is believed that such an actuation of the clutch can reduce wear and tear of the clutch, as well as reduce fuel consumption of the motor vehicle at standstill.

In accordance with yet another exemplary embodiment of the present invention, when the brake is actuated by means of the external force and the clutch is completely disengaged, the gearbox is shifted into neutral. It is believed that such a shifting of the gear into neutral preserves the throw-out bearing, i.e., reduces the wear and tear at the throw-out bearing.

In accordance with yet another exemplary embodiment of the present invention, the engine of the vehicle is shut off when the brake is actuated by means of the external force. It is believed that this reduces the amount of emissions emitted to the environment and therewith sustains our environment. Also, it is believed that this reduces the fuel consumption of the motor vehicle.

In accordance with yet another exemplary embodiment of the present invention, an actuating arrangement is provided for a brake of a vehicle, the brake acting on at least one first wheel of the vehicle. The vehicle has an engine which is connected to at least one second wheel via a drive train including a clutch and a gearbox, such that a drive torque can be transmitted from the engine to the at least one second wheel. The gearbox has a forward gear and a reverse gear, and the actuating arrangement includes a speedometer for detecting the speed of the vehicle, a brake actuator for actuating the brake by means of an external force independently of a manual actuation of the brake pedal of the vehicle, and a control unit for use with the brake actuator. The control unit controls the brake actuator when the engine is operating, such that the brake is automatically actuated by means of the external force when at least one condition selected from the group consisting of a fifth condition, a sixth condition, a seventh condition, and an eighth condition is fulfilled. The fifth condition is fulfilled when the forward gear is engaged in the gearbox and the speed of the vehicle is substantially zero. The sixth condition is fulfilled when the forward gear is engaged in the gearbox and the vehicle is moving backwards. The seventh condition is fulfilled when the reverse gear is engaged in the gearbox and the speed of the vehicle is substantially zero. The eighth condition is fulfilled when the reverse gear is engaged in the gearbox and the vehicle is moving forward.

In accordance with yet another exemplary embodiment of the present invention, the brake actuator is not directly connected to a brake pedal of the vehicle.

In accordance with yet another exemplary embodiment of the present invention, there is provided a clutch actuator for actuating the clutch, the clutch actuator being connected to the control unit.

In accordance with yet another exemplary embodiment of the present invention, the control unit completely disengages the clutch when the brake is actuated by means of the external force.

In accordance with yet another exemplary embodiment of the present invention, the gearbox is shifted into neutral when the brake is actuated by means of the external force and the clutch is completely disengaged.

In accordance with yet another exemplary embodiment of the present invention, the control unit disengages the brake when the accelerator pedal is actuated while the brake is actuated by means of the external force, and it controls the drive train such that a torque is transmitted from the engine to the at least one driven wheel of the vehicle.

In accordance with yet another exemplary embodiment of the present invention, the control unit shuts off the engine when the brake is actuated by means of the external force, and it starts the engine when the accelerator pedal is subsequently actuated.

BRIEF DESCRIPTION OF THE DRAWINGS

Exemplary embodiments of the present invention will be described in greater detail with reference to FIGS. 1 and 2 in which.

DESCRIPTION OF THE PREFERRED EMBODIMENTS

Figure 1:
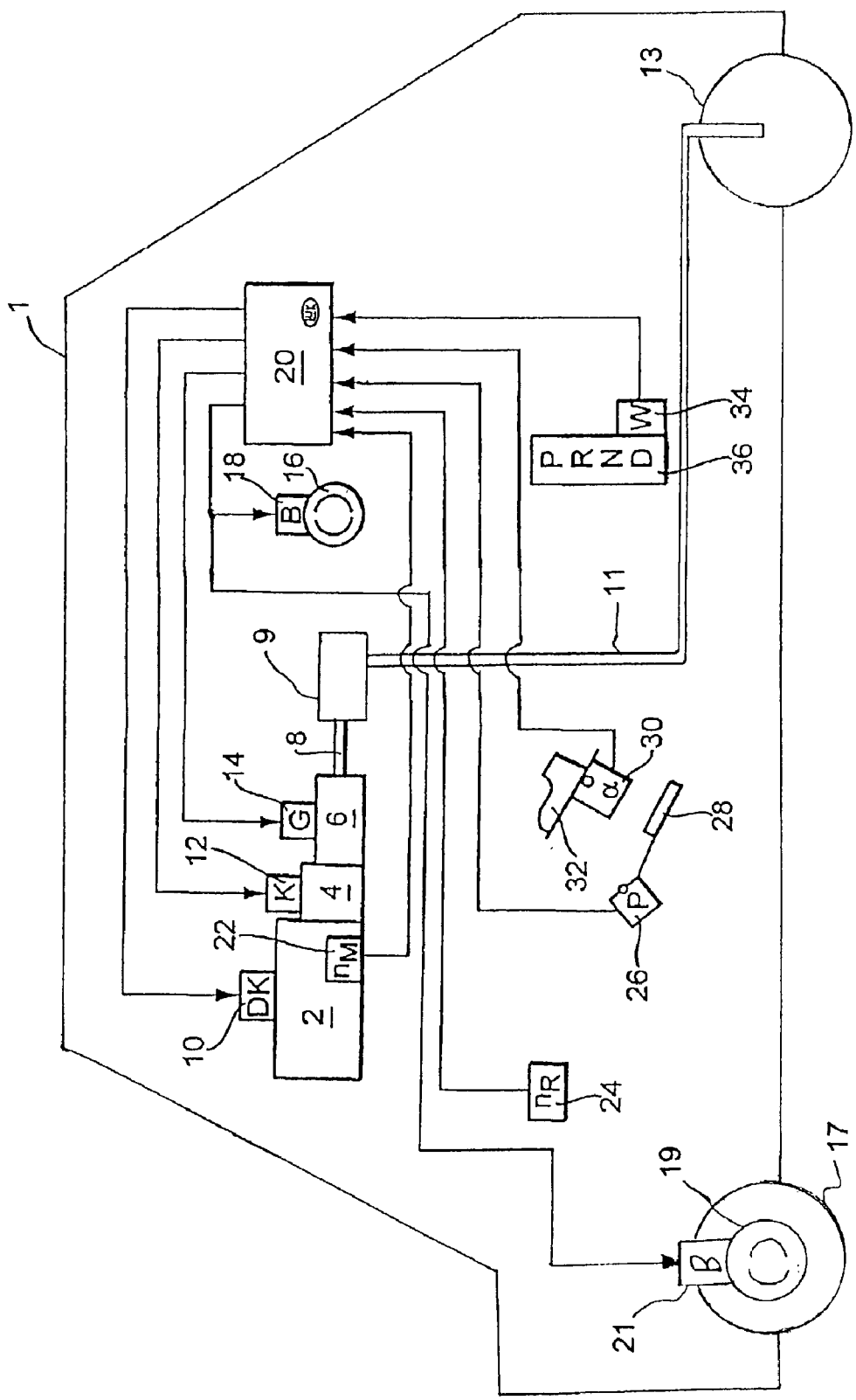
FIG. 1 shows a schematic block diagram of an exemplary embodiment of a motor vehicle drive train in accordance with the present invention, with an exemplary embodiment of an actuating arrangement in accordance with the present invention.

FIG. 1 shows an exemplary embodiment of a motor vehicle 1 in accordance with the present invention with an exemplary embodiment of an actuating arrangement in accordance with an exemplary embodiment of the present invention. Reference numeral 1 in FIG. 1 represents the motor vehicle, such as a passenger car or a truck. The motor vehicle 1 includes a drive train with a motor or engine 2, which is connected to a gearbox 6 via a clutch 4. The gearbox 6 has at least a forward gear and a reverse gear. Driving torque generated by the engine 2 and transmitted via the clutch 4 and the gearbox 6 is transmitted to a differential gear 9 by means of an output shaft 8. From the differential gear 9, the driving torque is transmitted to at least one driven wheel 13 of the motor vehicle 1, by means of a shaft 11. In spite of the fact that in FIG. 1 only one driven wheel 13 is depicted, the motor vehicle 1 can also have a plurality of driven wheels 13. When a plurality of driven wheels 13 is provided, the differential gear 9 can be adapted to distribute the driving torque to the plurality of driven wheels 13. Also, in spite of providing only one differential gear 9, a plurality of differential gears 9 can be provided.

A load of the engine 2 is controlled by means of a power or load control unit 10. The power control unit 10 can be actuated by means of a suitable actuator. The engine 2 can be a spark-ignition (OTTO) engine. When the engine 2 is a spark-ignition engine, the power control unit 10 can be a throttle valve. The engine 2 can also be a diesel engine. When the engine 2 is a diesel engine, the power control unit 10 can be a control shaft of a fuel injection pump.

The clutch 4 provided between the engine 2 and the gearbox 6 can be a common friction clutch, such as a dry-plate friction clutch or a wet-plate friction clutch. For example, the friction clutch can have disc-shaped plates. A clutch actuator 12 is provided for actuating the clutch 4 between an engaged condition and a disengaged condition. The clutch actuator 12 can be a hydraulic clutch actuator, a pneumatic clutch actuator, or an electric clutch actuator. When the clutch actuator 12 is an electric clutch actuator, it can be an electric motor.

The gearbox 6 can be a gear-shifting gearbox as known in the art, a continuously variable transmission (CVT), or an automatic transmission with a planetary gear set. The individual gears, speeds, or driving steps are shifted by means of a gearbox actuator 14, which can be a hydraulic gearbox actuator, a pneumatic gearbox actuator, or an electric gearbox actuator. When the gearbox actuator 14 is an electric gearbox actuator, it can be an electric motor.

Reference numerals 16 and 19 designate brakes of the motor vehicle 1. The brakes 16 and 19 are wheel brakes. In the exemplary embodiment depicted in FIG. 1, the brake 19 acts on a non-driven wheel 17 of the motor vehicle 1. The brake 16 acts on a driven wheel 13 of the motor vehicle 1. For the sake of clarity of FIG. 1, no connection is shown between brake 16 and driven wheel 13. The brakes 16 and 19 are actuated by means of brake actuators 18 and 21. The brake actuators 18 and 21 can be electric brake actuators, hydraulic brake actuators, or pneumatic brake actuators. When the brake actuators 18 and 21 are electric brake actuators, they can be electric motors.

In the motor vehicle 1 that includes an exemplary actuating arrangement in accordance with the present invention there are provided a plurality of sensors: an engine speed sensor 22 for detecting an engine speed $n_M$, a rotational speed sensor 24 for detecting a vehicle wheel rotational speed, or the number of revolutions of at least one of the wheels 13 and 17 of the motor vehicle 1, a pressure sensor 26 for detecting an actuation of a brake pedal 28 by the driver of the motor vehicle 1, a position: sensor 30 for detecting the position a of an accelerator pedal 32, and a gear selector sensor 34 for detecting a selection or position of a gear selector of a gear selection means 36.

A control unit 20 is provided for actuating or controlling the power control unit 10, the clutch actuator 12, the gearbox actuator 14, and the brake actuators 18 and 21. The control unit 20 can include a microprocessor with storage means such as a read-only memory (ROM). The control unit 20 receives as input signals the output signals provided by the engine speed sensor 22, the rotational speed sensor 24, the pressure sensor 26, the position sensor 30, and the gear selector sensor 34.

The structure and primary function of the engine 2, the clutch, 4, the gearbox 6, the shafts 8 and 11, the wheels 13 and 17, the actuators 10, 12, 14, 18 and 21, the sensors 22, 24, 26, 30 and 34 are known in the art and will not be described in detail. The gear selection means 36, the accelerator pedal, the brake pedal, and the differential gear 9 are known in the art and will also not be described in detail.

In accordance with an exemplary embodiment of the present invention, a brake control system including the brakes 16 and 19 and the brake actuators 18 and 21, the pressure sensor 26, the brake pedal 28 and the control unit 20, need not involve a direct connection between the brake pedal 28 and the brakes 16 and 19. When the brakes 16 and 19 are hydraulically connected, there need be no direct hydraulic connection between the brake pedal 28 and the brakes 16 and 19. When the brakes 16 and 19 are electrically actuated, there need be no direct functional connection between an actuation of the brake pedal 28 or the pressure sensor 26 and the brakes 16 and 19. When the brake system is a pneumatic brake system, there need be no direct connection between the brake pedal 28 or the pressure sensor 26 and the brakes 16 and 19. Additionally, in accordance with another exemplary embodiment of the present invention, the control unit 20 actuates the brake actuators 18 and 21 in response to an actuation of the brake pedal 28. Also, in accordance with yet another exemplary embodiment of the present invention, apart from actuating or controlling the brake actuators 18 and 21 in response to the actuation of the brake pedal 28, the control unit 20 can control further parameters, such as wheel slip, driving instability, etc., by the control of the brake actuators 18 and 21.

Also, in accordance with yet another exemplary embodiment of the present invention, the braking system can include a direct connection between the brake pedal 28 or the pressure sensor 26 and the brakes 16 and 19. Such a direct connection can be hydraulic, pneumatic, or electrical. In accordance with such an exemplary embodiment of the present invention, the braking force can be amplified by means of servo means or amplifiers, and can be individually controllable, for example as known from anti-lock braking systems (ABS). In this exemplary embodiment of the present invention, the braking system can include a source for generating an external force, such as a hydraulic, a pneumatic, or an electrical actuator. The source for generating an external force can actuate or control the brake actuators 18 and 21 of at least one brake 16 or 19. However, in accordance with another exemplary embodiment of the present invention, the source for generating an external force can also be adapted for controlling or actuating all brakes 16 or 19 of the motor vehicle 1, by means of the respective brake actuators 18 and 21. Also, the external force for actuating the brake 16 and 19 can also be provided directly to the brake 16 or 19 by means of the source for generating the external force.

An exemplary embodiment of the operation of the actuating arrangement depicted in FIG. 1 will now be described with reference to FIG. 2. It is assumed that the clutch actuator 12 controls or actuates the clutch 4, such that during normal driving operation there is always transmission of a certain driving torque from the engine 2 to the output shaft 8. Accordingly, when a driving step or gear is engaged in the gearbox 6, the drive train provides a creeping function. When the car is on a level road and the engine speed of the engine 2 is above its idle speed, the creeping function insures that there is always a driving force in a direction of the selected driving step or gear. In other words, the creeping function ensures that the car is moving at a low speed in the direction of the selected gear or driving step on a level road when the engine speed is above its idle speed.

Figure 2:
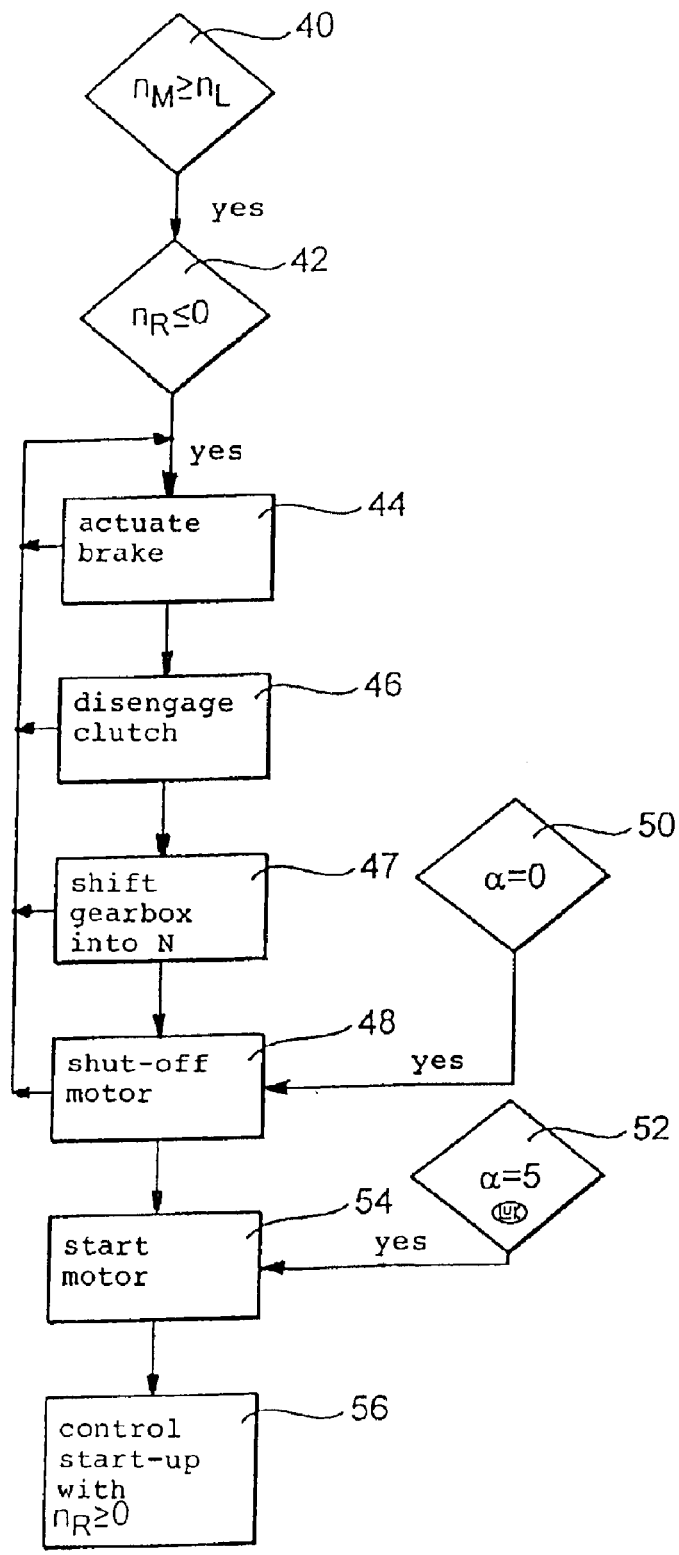
FIG. 2 shows a simplified flow chart of an exemplary embodiment of a method in accordance with the present invention for operating the actuating arrangement shown in FIG. 1.

The method depicted in FIG. 2 starts in step 40. In step 40, a determination is made whether the rotational speed $n_M$ of the engine 2 is larger than or equal to the idle speed $n_L$ of the engine 2. When the engine speed $n_M$ is not smaller than the idle speed $n_L$, the method continues to step 42. In step 42 a determination is made whether the wheel rotational speed $n_R$ equals zero or is even negative. When the wheel speed $n_R$ is substantially zero, it is assumed that the car is at a standstill. When the wheel speed $n_R$ is negative, the vehicle 1 is moving backward. In the example depicted in FIG. 2, it is assumed that the gear selector lever of the gear selection means 36 is in a position for driving forward. In other words, a forward gear is selected. When the wheel speed $n_R$ is zero or even negative, and a forward gear is selected in the gearbox 6, in step 44 the control unit 20 actuates or controls the brake actuators 18 and 21 such that the brakes 16 and 19 are actuated with a force which is sufficient to keep the motor vehicle 1 at a standstill. In accordance with an exemplary embodiment of the present invention, this automatic actuation of the brakes 16 and 19 in step 44 is indicated to the driver by means of an indicator, which can be integrated into the dashboard of the motor vehicle 1. The indicator can be an LED or a lamp. Accordingly, to keep the car at a standstill, it is not necessary for the driver of the car to actuate the accelerator pedal 32.

In the following step 46, the control unit 20 controls the clutch actuator 12 to completely disengage the clutch 4. When the clutch 4 is completely disengaged, the engine 2 does not have to act against the resistance of the actuated brakes 16 and 19. Thus, wear and tear of the clutch 4 is reduced, and in particular of the friction plate of the clutch 4. Then, in the following step 47, the control unit 20 signals the gearbox actuator 14 to shift into neutral N, i.e., in a gear or step where no driving torque is transmitted from an input shaft of the gearbox 6 to the output shaft of the gearbox 6, in order to conserve the throw-out bearing. This allows for the clutch 4 being completely disengaged.

In step 50, a determination is made as to whether the driver is actuating the accelerator pedal. When it is determined in step 50 that the position α of the accelerator pedal 32 is zero, i.e., the driver is not actuating the accelerator pedal, the control unit 20 stops the engine in step 48, i.e., shuts off the engine. That can be done, for example, by stopping the injection of fuel into the engine.

In step 52, a determination is made as to whether the driver renews actuation of the accelerator pedal 32. In other words, in step 52 it is determined whether after the engine has been stopped in step 48, the driver is actuating the accelerator pedal 32. When the response in step 52 is positive, i.e., the driver has again actuated the accelerator pedal 32 after the engine 2 has been stopped in step 48, the control unit 20 controls the engine 2, such that the engine 2 is restarted in step 54.

After the engine has been restarted in step 54, the motor vehicle 1 is accelerated from standstill in step 56, such that the wheels 13 and 17 of the motor vehicle 1 are not turning backward, i.e., that the motor vehicle 1 is not moving backwards on an incline.

The method described with reference to FIG. 2 in accordance with an exemplary embodiment of the present invention, can be carried out in the motor vehicle 1 with the actuation arrangement in accordance with an exemplary embodiment of the present invention as shown in FIG. 1.

In accordance with yet another exemplary embodiment of the present invention, the control unit 20 can be adapted for controlling the brake actuators 18 and 21 when the engine 2 is operating, such that the brakes 16 and 19 are automatically actuated, i.e., without an actual actuation of the brake pedal 28, by means of the external force generated by the brake actuator when at least one condition of the following conditions a)–d) is fulfilled.

a) The control unit 20 controls the brake actuators 18 and 21 such that the brakes 16 and 19 are automatically actuated when a forward gear is engaged in the gearbox 6 and the speed of the vehicle is substantially zero.

b) The control unit 20 controls the brake actuators 18 and 21 such that the brakes 16 and 19 are automatically actuated when a forward gear is engaged in the gearbox and the motor vehicle 1 is moving backward.

c) The control unit 20 controls the brake actuators 18 and 21 such that the brakes 16 and 19 are automatically actuated when the reverse gear is engaged in the gearbox 6 and the speed of the motor vehicle 1 is substantially zero.

d) The control unit 20 controls the brake actuators 18 and 21, such that the brakes 16 and 19 are automatically actuated when the reverse gear is engaged in the gearbox 6 and the motor vehicle 1 is moving forward.

Furthermore, in yet another exemplary embodiment of the present invention, the control unit 20 can be adapted to automatically actuate the brakes 16 and 19 by means of the brake actuators 18 and 21 when the engine is operating and when the speed of the motor vehicle 1 is substantially zero, or when a forward gear is engaged in the gearbox 6 and the motor vehicle 1 is moving backward, or when the reverse gear is engaged in the gearbox 6 and the motor vehicle 1 is moving forward.

The above-described exemplary embodiments of the actuating arrangement of the present invention, the exemplary embodiments of the method for operating an actuating arrangement in accordance with the present invention, and the exemplary embodiments of the motor vehicle 1 in accordance with the present invention can be combined and adapted without departing from the present invention.

For example, the exemplary embodiment for the method described with respect to FIG. 2 can be adapted such that when the motor vehicle 1 is at a standstill with the engine 2 at idle speed for more than a predetermined period of time, the brakes 16 and 19 are automatically actuated. Such an automatic actuation of the brakes 16 and 19 can be coupled with or can be independent of an actuation of the brake pedal 28. Also in accordance with an exemplary embodiment of the present invention, the automatic stopping of the engine 2 in step 48 can be coupled to a predetermined period of time or to a selection which can be actuated by the driver. Accordingly, a timer can be set in step 48 and the engine 2 can be shut off when the timer has reached a predetermined time value. Also, a driver can suppress the shut-off of the engine in step 48. This can ensure a very short time to accelerate the motor vehicle 1 from a standstill on an incline.

In accordance with an exemplary embodiment of the actuating arrangement depicted in FIG. 1, the clutch 4 and the clutch actuator 12 can be replaced by a hydrodynamic converter. When the hydrodynamic converter is provided in the actuating arrangement in accordance with the exemplary embodiment of the method depicted in FIG. 2, the step 46 is not applicable.

The patent claims forming part of this application are merely proposals without prejudicing additional and/or broader patent protection. Furthermore, applicants and their assignee reserve the right to claim features which, heretofore, can be found solely in the specification and/or the drawings.

References made in the dependent claims to preceding claims are indicative of additional developments of the subject matter of the independent claims, such as of combinations of the features recited in the parent claims and in the respective dependent claims; they do not constitute a waiver of the acquisition of independent claim protection for the features of such independent claims.

Thus, the features recited in the dependent claims can constitute independent inventions having a standing of their own, regardless of the subject matter recited in the respective parent claims.

Since the features and/or subject matter of the dependent claims can be independent inventions with respect to prior art at the priority date, the applicants and their assignee reserve the right to make those features or that subject matter as the subject matter of independent claims or dependent claims of a divisional application.

Moreover, the invention is not limited to the described and illustrated embodiment or embodiments. On the contrary, the invention encompasses numerous changes and modifications, including, for example, all such modifications and elements, combinations, and/or materials which are or can be deemed to be novel and can be derived from or arrived at upon perusal of the specification, and/or the present claims, and/or the present drawings, not only as regards the structural features, but also concerning the method or methods, and/or the process or processes of manufacturing, assembling, converting, modifying, testing, and/or others.

What is claimed is:

1. A method for automatic actuation of a brake of a vehicle, wherein the vehicle includes a brake pedal and the brake acts on at least one first wheel of the vehicle, wherein the vehicle has an engine that is operatively connected to at least one second wheel via a drive train including a clutch and a gearbox for transmitting a drive torque from the engine to the at least one second wheel, wherein the gearbox has at least one forward gear and a reverse gear, the method comprising the steps of:

automatically actuating the brake of the vehicle by means of an external force applied independently of driver actuation of the brake pedal when the engine is operating and when at least one condition selected from the group consisting of a first condition, a second condition, a third condition, and a fourth condition is fulfilled;

wherein the first condition is fulfilled by actuating the clutch such that the transmission of drive torque from the engine to the at least one second wheel is not completely interrupted, the at least one forward gear is engaged in the gearbox, and the speed of the vehicle is substantially zero;

wherein the second condition is fulfilled by actuating the clutch such that transmission of drive torque from the engine to the at least one second wheel is not completely interrupted, the at least one forward gear is engaged in the gearbox, and the vehicle is moving backward;

wherein the third condition is fulfilled by actuating the clutch such that the transmission of drive torque from the engine to the at least one second wheel is not completely interrupted, the reverse gear is engaged in the gearbox, and the speed of the vehicle is substantially zero; and wherein the fourth condition is fulfilled by actuating the clutch such that the transmission of drive torque from the engine to the at least one second wheel is not completely interrupted, the reverse gear is engaged in the gearbox, and the vehicle is moving forward.

2. A method in accordance with claim 1, wherein the external force is provided by an actuator that is operable independently of the brake pedal of the vehicle.

3. A method in accordance with claim 1, including the step of actuating the clutch by the external force in response to predetermined operating parameters of the drive train.

4. A method in accordance with claim 3, including the step of completely disengaging the clutch when the vehicle brake is actuated by the external force.

5. A method in accordance with claim 4, including the step of shifting the gearbox into neutral when the vehicle brake is actuated by the external force and the clutch is completely disengaged.

6. A method in accordance with claim 3, including the step of shutting off the engine when the vehicle brake is actuated by the external force.

7. A method for automatic actuation of a brake of a vehicle, wherein the vehicle has an engine that is operatively connected to at least one wheel via a clutch and a gearbox such that a drive torque can be transmitted from the engine to the at least one wheel, wherein the gearbox has at least one forward gear and a reverse gear, the method comprising the steps of:

determining whether the transmission of drive torque from the engine to the at least one wheel is not completely interrupted;

determining an operating state of the engine;

determining whether at least one forward gear or a reverse gear is engaged in the gearbox;

determining at least one of a speed of the vehicle and a direction of travel of the vehicle;

automatically actuating the brake of the vehicle by an actuator that is independent of a driver-operated brake pedal when the transmission of the drive torque from the engine to the at least one wheel is not completely interrupted, the engine is operating, the at least one forward gear is engaged in the gearbox, and the speed of the vehicle is substantially zero;

automatically actuating the brake of the vehicle by the actuator when the transmission of drive torque from the engine to the at least one wheel is not completely interrupted, the engine is operating, the at least one forward gear is engaged in the gearbox, and the direction of travel of the vehicle is backward;

automatically actuating the brake of the vehicle by the actuator when the transmission of drive torque from the engine to the at least one wheel is not completely interrupted, the engine is operating, the reverse gear is engaged in the gearbox, and the speed of the vehicle is substantially zero;

automatically actuating the brake of the vehicle by the actuator when the transmission of drive torque from the engine to the at least one wheel is not completely interrupted, the engine is operating, the reverse gear is engaged in the gearbox, and the direction of travel of the vehicle is forward.

8. An actuating arrangement for a brake of a vehicle, the brake acting on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuating arrangement comprising:

a speed sensor for detecting vehicle speed;

a brake actuator for actuating the brake by means of an external force independently of driver actuation of a brake pedal of the vehicle; and a control unit for controlling the brake actuator when the engine is operating, wherein the control unit is operable to automatically initiate a braking action of a brake on the vehicle independently of driver actuation of the brake pedal when at least one condition selected from the group consisting of a first condition, a second condition, a third condition, and a fourth condition is fulfilled;

wherein the first condition is fulfilled when the at least one forward gear is engaged in the gearbox and the speed of the vehicle is substantially zero;

wherein the second condition is fulfilled when the at least one forward gear is engaged in the gearbox and the vehicle is moving backward;

wherein the third condition is fulfilled when the reverse gear is engaged in the gearbox and the speed of the vehicle is substantially zero; and wherein the fourth condition is fulfilled when the reverse gear is engaged in the gearbox and the vehicle is moving forward.

9. An actuating arrangement in accordance with claim 8, including a clutch actuator for actuating the clutch, wherein the clutch actuator is operatively connected to the control unit.

10. An actuating arrangement in accordance with claim 9, wherein when the brake is actuated by the brake actuator by the external force and an accelerator is actuated, the control unit operates the brake actuator such that the brake is disengaged and the drive train transmits drive torque from the engine to the at least one second wheel.

11. An actuating arrangement for a brake of a vehicle, the brake acting on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuating arrangement comprising:

a speed sensor for detecting vehicle speed:

a brake actuator for actuating the brake by means of an external force independently of an actuation of a brake pedal of the vehicle; and a control unit for controlling the brake actuator when the engine is operating, such that the brake is automatically actuated by the external force provided by the brake actuator when at least one condition selected from the group consisting of a first condition, a second condition, a third condition, and a fourth condition is fulfilled;

wherein the first condition is fulfilled when the at least one forward gear is engaged in the gearbox and the speed of the vehicle is substantially zero:

wherein the second condition is fulfilled when the at least one forward gear is engaged in the gearbox and the vehicle is moving backward;

wherein the third condition is fulfilled when the reverse gear is engaged in the gearbox and the speed of the vehicle is substantially zero;

wherein the fourth condition is fulfilled when the reverse sear is engaged in the gearbox and the vehicle is moving forward; and wherein the brake actuator is not directly connected to a brake pedal of the vehicle.

12. An actuating arrangement for a brake of a vehicle, the brake acting on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuating arrangement comprising:

a speed sensor for detecting vehicle speed:

a clutch actuator for actuating the clutch, wherein the clutch actuator is operatively connected to the control unit;

a brake actuator for actuating the brake by means of an external force independently of an actuation of a brake pedal of the vehicle; and a control unit for controlling the brake actuator when the engine is operating, such that the brake is automatically actuated by the external force provided by the brake actuator when at least one condition selected from the group consisting of a first condition, a second condition, a third condition, and a fourth condition is fulfilled;

wherein the first condition is fulfilled when the at least one forward gear is engaged in the gearbox and the speed of the vehicle is substantially zero;

wherein the second condition is fulfilled when the at least one forward gear is engaged in the gearbox and the vehicle is moving backward;

wherein the third condition is fulfilled when the reverse gear is engaged in the gearbox and the speed of the vehicle is substantially zero;

wherein the fourth condition is fulfilled when the reverse gear is engaged in the gearbox and the vehicle is moving forward; and wherein when the brake is actuated by the brake actuator by the external force, the control unit operates the clutch actuator to completely disengage the clutch.

13. An actuating arrangement in accordance with claim 12, wherein when the brake is actuated by the brake actuator by the external force and the clutch is completely disengaged, the control unit operates the gearbox to shift it into neutral.

14. An actuating arrangement for a brake of a vehicle, the brake acting on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuating arrangement comprising:

a speed sensor for detecting vehicle speed;

a clutch actuator for actuating the clutch, wherein the clutch actuator is operatively connected to the control unit;

a brake actuator for actuating the brake by means of an external force independently of an actuation of a brake pedal of the vehicle; and a control unit for controlling the brake actuator when the engine is operating, such that the brake is automatically actuated by the external force provided by the brake actuator when at least one condition selected from the group consisting of a first condition, a second condition, a third condition, and a fourth condition is fulfilled;

wherein the first condition is fulfilled when the at least one forward gear is engaged in the gearbox and the speed of the vehicle is substantially zero;

wherein the second condition is fulfilled when the at least one forward gear is engaged in the gearbox and the vehicle is moving backward;

wherein the third condition is fulfilled when the reverse gear is engaged in the gearbox and the speed of the vehicle is substantially zero;

wherein the fourth condition is fulfilled when the reverse gear is engaged in the gearbox and the vehicle is moving forward; and wherein the control unit shuts the engine off when the brake is actuated by the brake actuator by the external force and starts the engine when an accelerator is actuated subsequently.

15. An actuating arrangement for a brake of a vehicle, the brake acting on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuating arrangement comprising:

a speed sensor for detecting vehicle speed;

a brake actuator for actuating the brake by means of an external force independently of driver actuation of a brake pedal of the vehicle; and a control unit for controlling the brake actuator when the engine is operating, wherein the control unit is operable to automatically initiate a braking action of a brake on the vehicle independently of driver actuation of the brake pedal when at least one condition selected from the group consisting of a first condition, a second condition, and a third condition is fulfilled;

wherein the first condition is fulfilled when the vehicle speed is substantially zero;

wherein the second condition is fulfilled when the at least one forward gear is engaged in the gearbox and the vehicle is moving backward; and wherein the third condition is fulfilled when the reverse gear is engaged in the gearbox and the vehicle is moving forward.

16. A motor vehicle including an actuation arrangement for actuating a brake of the vehicle, wherein the brake acts on at least one first wheel of the vehicle, wherein the vehicle has an engine that is operatively connected to at least one second wheel via a drive train including a clutch and a gearbox such that a drive torque can be transmitted from the engine to the at least one second wheel, wherein the gearbox has at least one forward gear and a reverse gear, the actuation arrangement comprising:

a speed sensor for detecting vehicle speed;

a brake actuator for actuating the brake by means of an external force independently of driver actuation of a brake pedal of the vehicle; and a control unit for controlling the brake actuator when the engine is operating, wherein the control unit is operable to automatically initiate a braking action of a brake on the vehicle independently of driver actuation of the brake pedal when at least one condition selected from the group consisting of a first condition, a second condition, a third condition, and a fourth condition is fulfilled;

wherein the first condition is fulfilled when the at least one forward gear is engaged in the gearbox and the speed of the vehicle is substantially zero;

wherein the second condition is fulfilled when the at least one forward gear is engaged in the gearbox and the vehicle is moving backward;

wherein the third condition is fulfilled when the reverse gear is engaged in the gearbox and the speed of the vehicle is substantially zero; and wherein the fourth condition is fulfilled when the reverse gear is engaged in the gearbox and the vehicle is moving forward.

17. A method for maintaining a motor vehicle at rest on an incline, wherein the motor vehicle has a braking system and a drive train that includes an engine operatively coupled with a drive wheel through an intervening driver-actuated clutch connected with a gearbox having a forward gear and a reverse gear, said method comprising:

a) sensing whether one of the following operating conditions exists at a time the engine is in operation and the clutch is operated to transfer a partial engine torque to the drive wheel:
1) a forward gear of the gearbox is engaged and the vehicle speed is substantially zero;
2) a forward gear of the gearbox is engaged and the vehicle is rolling backward;
3) a reverse gear of the gearbox is engaged and the vehicle speed is substantially zero;
4) a reverse gear of the gearbox is engaged and the vehicle is rolling forward;

b) when one of the sensed operating conditions exists, automatically operating the vehicle braking system to engage a brake without driver intervention.

18. A method for automatically operating a motor vehicle brake, wherein the motor vehicle has a drive train that includes an engine operatively coupled with a drive wheel through an intervening driver-actuated clutch connected with a gearbox having a forward gear and a reverse gear, said method comprising:

a) sensing whether one of the following operating conditions exists at a time the engine is in operation and the clutch is operated by a driver to transfer a partial engine torque to the drive wheel:
1) a forward gear of the gearbox is engaged and the vehicle speed is substantially zero;
2) a forward gear of the gearbox is engaged and the vehicle is rolling backward;
3) a reverse gear of the gearbox is engaged and the vehicle speed is substantially zero;
4) a reverse gear of the gearbox is engaged and the vehicle is rolling forward;

b) when one of the sensed operating conditions exists, automatically engaging the brake without driver intervention.

* * * * *